Patented Nov. 21, 1944

2,363,227

UNITED STATES PATENT OFFICE 2,363,227

FERMENTATION PROCESS FOR THE PRODUCTION OF RIBOFLAVIN (VITAMIN B$_2$)

Paul R. Burkholder, New Haven, Conn., assignor to Research Corporation, New York, N. Y., a corporation of New York No Drawing. Application April 13, 1943, Serial No. 482,932

11 Claims. (Cl. 195—92)

This invention relates to the production of riboflavin and is particularly directed to a method of producing riboflavin by the fermentation of sugars by yeast.

I have found that by growing the yeast species *Candida guilliermondia* on a suitable nutrient medium containing sugars, fermentation liquors containing substantial amounts of riboflavin may be produced. A particular advantage of the method of the invention is that the major part of the riboflavin is found in the liquid culture medium and only a minor part is contained in the yeast cells.

*Candida guilliermondia* is a recognized species of yeast. While different strains of this species may vary to some extent in vigor of growth and yield of riboflavin, all of the strains which have been tested have produced substantial quantities of riboflavin in the method of the invention. For example, strains of the species obtained from pickle brine, sugar syrup, milk and milk products, and from animals in which or on which the yeast may have been living as a low grade pathogen, have given satisfactory results. For more particular identification, a strain of the species *Candida guilliermondia* obtained from acidophilous milk, which has been thoroughly tested with satisfactory results in the method of the invention, has been deposited in the American Type Culture Collection under the designation "Species No. 9058."

For a disclosure of the fermentation medium I shall first give a detailed analysis of a medium which I have found to be highly satisfactory for the fermentation and then describe the permissible variations of the composition of that medium.

The specific medium had the following composition:

| | | |
|---|---|---|
| Potassium phosphate KH$_2$PO$_4$ | gm | 0.5 |
| Magnesium sulphate MgSO$_4$·7H$_2$O | gm | 0.5 |
| Calcium chloride CaCl$_2$·2H$_2$O | gm | 0.3 |
| Ammonium sulphate (NH$_4$)$_2$SO$_4$ | gm | 2.0 |
| Potassium iodide KI | mg | 0.1 |
| Asparagine | gm | 2.0 |
| Dextrose | gm | 20.0 |

Trace elements (to give in the final culture solution the following concentrations in p. p. m.):

| | |
|---|---|
| Boron | 0.01 |
| Manganese | 0.01 |
| Zinc | 0.07 |
| Copper | 0.01 |
| Molybdenum | 0.01 |
| Iron | 0.01 |

(These may be supplied as chlorides or other soluble salts.)

Biotin (can be supplied pure, as methyl ester, or as crude concentrate)

microgram__ 1.0

The phosphate is an essential component of the medium. Increasing the phosphate content of the medium above about 1.5 grams per liter causes a marked reduction in vitamin B$_2$ (riboflavin) production and reduction of the phosphate content of the medium to a very low figure (of the order of .05 to .10 gram per liter) results in a reduction in both the growth of the yeast and the vitamin B$_2$ production. From about .5 to about 1.0 gram of phosphate calculated as KH$_2$PO$_4$ per liter has been found to be a satisfactory range with respect to both yeast growth and vitamin B$_2$ production.

Omission of the asparagine without other change in the medium produces very little effect upon growth of the yeast but reduces the vitamin B$_2$ production to a very low level. The vitamin B$_2$ production varies directly with the asparagine content of the medium within the range from about 0.1 gram to 10 grams per liter. It is possible to omit the asparagine and maintain fairly good production of vitamin B$_2$ by supplying the necessary nitrogen as ammonium sulfate. When ammonium sulfate is the sole source of nitrogen the vitamin B$_2$ production has been found to vary from 2.3 to 17.8 micrograms per ml. with variation in the ammonium sulfate content of the media from .5 to 10 grams per liter. Much better results generally are obtained when nitrogen is supplied both as inorganic nitrogen (ammonium sulfate) and as organic nitrogen such as asparagine. The asparagine may be replaced or supplemented by other sources of organic nitrogen such as glycine.

Inexpensive natural sources of organic nitrogen such as crude preparations of amides or natural whole materials obtained from sprouted seeds such as *Lupinus albus*, *L. angustifolius*,

*Vicia faba*, soy bean, vetch and malted grains may be used, except that substances occurring in whole malt and various seed meals inhibit the production of riboflavin without diminishing growth of the yeast. Examples of such inhibiting substances are certain sugars such as galactose and relatively high concentrations of certain amino acids. The legumes mentioned are rich sources of amides which may be extracted with hot water and precipitated in cold water in a form suitable for use in the process. With a medium of the composition given above a yield of about 10 micrograms of vitamin $B_2$ may be expected. By supplementing the asparagine by other sources of organic nitrogen, using normal amounts of ammonium sulfate, quite high yields of vitamin $B_2$ may be produced. For instance, by using 2 grams per liter of asparagine with 0.8 and 8.0 gms. of glycine per liter I have obtained yields of 47 and 56 micrograms of vitamin $B_2$ per ml. respectively. The same medium containing 2 grams of asparagine per liter supplemented by 0.8 gm. of valine per liter gave 44 micrograms of vitamin $B_2$ per ml. and supplemented with arginine the yield was 37.5 micrograms per ml. and with methionine 60.5 micrograms per ml.

Dextrose is the preferred sugar but may be substituted wholly or in part by other sugars such as sucrose, corn syrup, levulose and mannose.

Biotin has been found to be an essential ingredient of the medium. It may be supplied as the pure methyl ester or as a crude concentrate or as a refined natural material contained in seeds, sprouts, malt and the like. Although many other species of yeast require other vitamins for growth, the species *Candida guilliermondia* appears to require biotin only and it is presumed to synthesize ample amounts of any other vitamin or vitamins which are essential to its growth.

The essential character of all of the other ingredients of the specific medium described above has not been precisely determined. It appears, however, that the trace elements may vary in concentration, inasmuch as it has been found that when natural ground and surface waters which contain traces of a variety of dissolved minerals are used in making up the medium it is unnecessary to add the trace elements.

In general it may be said that a satisfactory medium for the fermentation comprises a sugar together with the nutrient and accessory materials, typically, a soluble phosphate, an ammonium compound, an organic nitrogen compound such as asparagine and/or glycine, biotin, mineral salts and trace elements. As has been indicated above, considerable variation with respect to the individual ingredients of the nutrient medium is permissible, but marked departures from the typical solution appreciably alter the yields of riboflavin.

The fermentation is carried out as follows:

Stock cultures of the yeast species *Candida guilliermondia* are carried on malt agar or on yeast extract-glucose-peptone agar. In order to produce yeast inoculum free from any appreciable amount of substances which might inhibit riboflavin formation, it has been found advantageous to grow the inoculum yeast on nutrient 1.5 percent agar or in nutrient solution, the composition of the nutrients being as in the basal medium given above. Containers are thoroughly clean and after admitting the fermentation medium, it and the interior of the container are sterilized by heat, preferably by steam, under a pressure of 15 pounds (120° C.) for fifteen minutes. After cooling to about 30° C. the medium is inoculated with a suspension of yeast stock. The medium is seeded to contain not less than 10 milligrams of moist yeast per liter. Growth of the yeast is allowed to proceed at about 30° C. for about a week.

The vitamin $B_2$ may then be recovered from the fermentation liquor by known methods such as by adsorption on and elution from suitable powders such as florisil or by precipitation or extraction by means of various reagents.

A characteristic of the process is that the bulk of the vitamin $B_2$ produced is found in the culture fluid and only a relatively small proportion of it remains in the yeast. Consequently extraction of the vitamin from the yeast cells, following separation thereof from the culture medium, generally is economically unnecessary.

Aerobic conditions are essential to the fermentation. If the normal supply of air is replaced by nitrogen the growth of the yeast is not prevented but the yield of vitamin $B_2$ is markedly reduced. The aeration provided for a culture of 25 ml. of medium contained in a cotton plugged 125 ml. Erlenmeyer flask kept at 30° C. gives near optimum results. With twice this volume of medium, under otherwise the same conditions, less riboflavin is formed. Also continuous saturation of the medium with an air stream results in diminished yields.

It is preferable to carry out the fermentation in darkness or greatly reduced light.

The temperature during incubation must be controlled in order to speed up the fermentation and increase the total yield of vitamin $B_2$. At 30° C. the yield is generally more than twice that obtained at temperatures of from 20 to 25° C. At 35° C. and higher decreased yields are obtained.

Increasing the sugar content of the medium, other conditions remaining normal, does not appreciably increase the yield per unit of sugar consumed but does in general increase the vitamin $B_2$ content of the fermentation liquor.

The hydrogen ion concentration of the medium may vary within a fairly wide range without affecting the growth of the yeast but the yield of vitamin $B_2$ varies within the range from pH 3.0 to pH 7.5. A preferred operating range is from pH 5.0 to pH 7.0. Buffering the medium at a pH of about 5.0 to 6.0 has been found to give most satisfactory results.

Addition of cyanide aseptically in small amounts to the medium at the start of the growth period inhibits the growth. If, however, growth is allowed to proceed for about 24 hours and small amounts of sterile KCN or cyanide gas as HCN are then added to the medium and well mixed to produce a molar concentration within the range from about $1 \times 10^{-4}$ to about $10 \times 10^{-4}$ the yield of vitamin $B_2$ is markedly increased. Higher concentrations of KCN result in appreciable inhibition of growth of the yeast and delay the formation of the vitamin $B_2$.

In a specific instance a medium of the analysis given and containing 2.5 percent by weight of solids was fermented as described, for one week at 30° C. (without cyanide) and the following results were obtained: The fermentation liquid contained 10 micrograms of vitamin $B_2$ per ml. The yield of vitamin $B_2$ was 0.5 milligram for each gram of glucose supplied to the medium.

About 5 milligrams of equivalent riboflavin were produced for each gram of asparagine supplied. About three milligrams of vitamin $B_2$ were stored in the solution for every gram of moist yeast produced. If it is assumed that no change in the total solids content of the medium occurs during the fermentation then about 1 milligram of riboflavin was produced for each 2.5 grams of solids in the medium. Since a considerable loss of solids in the medium does occur as a result of the fermentation the final fermentation liquid contains a considerably higher ratio of riboflavin to solids than 1 mg. per 2.5 grams. In another experiment, where 2.0 gm. of asparagine and 0.8 gm. of glycine per liter were used and the medium was aerated properly at 30° C., 47 micrograms of riboflavin per ml. were produced. The dried powder derived from the fermented liquor, from which all yeast has been removed by filtration at the end of the growth period of 6 days, showed a riboflavin content of 7 mg. per gram of solids present in the fermented liquor.

The presence of riboflavin in the fermented medium is shown by the appearance of a very deep yellow pigmentation and also by the typical green fluorescence under ultraviolet radiation. The presence of riboflavin or vitamin $B_2$ is further proved by fluorescence photometry and by microbiological assay with Lactobacillus casei ε.

It will be appreciated that the above described variations may be employed by one skilled in the art depending upon local conditions and supplies to promote the economical production of the vitamin $B_2$.

The solution produced by the fermentation may be preserved by pasteurization and its riboflavin or vitamin $B_2$ content may be raised to any desired concentration by known methods such as filtration to remove suspended solids, evaporation to remove water, crystallization to remove unconsumed sugar and mineral salts, etc. Finally the pure riboflavin may be separated and recovered as pure crystals by adsorption and elution or by precipitation or extraction by means of suitable reagents.

I claim:

1. Process for the production of riboflavin which comprises growing the yeast species Candida guilliermondia upon a medium having a pH value of from about 3.0 to 7.5 containing a sugar of the group consisting of dextrose, sucrose, levulose, mannose and corn syrup, biotin, a water-soluble phosphate, a nitrogenous nutrient of the group consisting of ammonium and asparagine, and mineral salts including elements of the group consisting of K, Mg, S, Ca, I, B, Mn, Zn, Cu, Mo and Fe at a temperature of from about 25° C. to about 35° C. in the presence of oxygen and under partial exclusion of light.

2. Process as defined in claim 1 in which cyanide is added to the medium after the yeast growth therein has become rapid.

3. Process as defined in claim 1 in which the concentration of phosphate in the medium, calculated at $KH_2PO_4$, is within the range from .05 to 1.5 grams per liter.

4. Process as defined in claim 1 in which the medium has approximately the following composition:

| | |
|---|---|
| Potassium phosphate $KH_2PO_4$ | gm 0.5 |
| Magnesium sulfate $MgSO_4 \cdot 7H_2O$ | gm 0.5 |
| Calcium chloride $CaCl_2 \cdot 2H_2O$ | gm 0.3 |
| Ammonium sulphate $(NH_4)_2SO_4$ | gm 2.0 |
| Potassium iodide KI | mg 0.1 |
| Asparagine | gm 0.5 to 2.0 |
| Dextrose | gm 20.0 |
| Biotin | microgram 1.0 | per liter and

| | |
|---|---|
| Boron | 0.01 |
| Manganese | 0.01 |
| Zinc | 0.07 |
| Copper | 0.01 |
| Molybdenum | 0.01 |
| Iron | 0.01 | parts per million.

5. Process as defined in claim 1 in which the organic nitrogen is supplied by asparagine within the concentration range of from 0.1 to 10 grams per liter of medium.

6. Process as defined in claim 1 in which the sugar is principally dextrose in a concentration of about 20 grams per liter.

7. Process as defined in claim 1 in which the fermentation is carried out at a temperature of about 30° C.

8. Process as defined in claim 1 in which the sugar is dextrose in a concentration of about 80 to 120 grams per liter.

9. Process as defined in claim 1 in which the pH value of the medium is initially set at about 5 to 6.

10. Process for the production of riboflavin which comprises inoculating a medium composed of dextrose, asparagine, biotin and soluble compounds of potassium, magnesium, calcium, ammonium, boron, manganese, zinc, copper, molybdenum, iron, phosphorus, sulfur and iodine with the yeast species Candida guilliermondia, and permitting the mixture to ferment in the presence of oxygen for at least several days under at least partial exclusion of light while maintaining the temperature at from about 25° to 35° C., the pH value of the medium initially within the range from about 5 to 7, the phosphorus as $KH_2PO_4$ within the range from 0.05 to 1.5 grams per liter, the asparagine within the range from 0.1 to 10 grams per liter, and the dextrose within the range from about 20 to 120 grams per liter.

11. Process as defined in claim 10 in which cyanide is added to the fermenting mixture after vigorous growth is in progress in a molar concentration within the range from $10 \times 10^{-4}$ to $10 \times 10^{-4}$.

PAUL R. BURKHOLDER.